United States Patent [19]

Kosaka et al.

[11] 4,007,152

[45] Feb. 8, 1977

[54] SEALING MATERIAL FOR PREVENTING WATER-LEAKAGE AND METHOD OF MANUFACTURING SAME

[75] Inventors: Yosikazu Kosaka, Otsu; Makoto Kounosu, Kyoto; Masaaki Kondo, Otsu, all of Japan

[73] Assignee: Toray Industries, Inc., Tokyo, Japan

[22] Filed: May 30, 1974

[21] Appl. No.: 474,688

[52] U.S. Cl. .............................. 260/31.6; 112/402; 260/30.2; 260/31.8 R; 260/31.8 B; 260/31.8 L; 260/32.6 R; 260/33.4 R; 260/844

[51] Int. Cl.$^2$ ..................... C08K 5/05; C08K 5/10; C08K 5/12; C08L 29/04

[58] Field of Search ......... 260/31.6, 31.8 L, 33.4 R

[56] References Cited

UNITED STATES PATENTS

| | | | |
|---|---|---|---|
| 2,448,358 | 8/1948 | Dangelmajer | 260/31.8 L |
| 2,611,756 | 9/1952 | Pockel | 260/31.8 L |
| 2,850,471 | 9/1958 | Klein | 260/31.6 |
| 2,963,461 | 12/1960 | Pockel | 260/31.6 |
| 3,516,960 | 6/1970 | Martins et al. | 260/31.6 |

OTHER PUBLICATIONS

Hach's Chemical Dictionary, Fourth Edition, McGraw-Hill, N.Y. 1969, p. 597.

*Primary Examiner*—Allan Lieberman

[57] ABSTRACT

The sealing material consists of (a) a water-insoluble partially saponified polyvinyl alcohol having a saponification degree of 35 to 65% by mole and a number average polymerization degree of 500 to 3,500, and (b) 5 to 100 parts by weight, based on 100 parts by weight of said partially saponified polyvinyl alcohol, of a mixture of glycerin and the glyceryl ester of a carboxylic acid.

5 Claims, No Drawings

SEALING MATERIAL FOR PREVENTING WATER-LEAKAGE AND METHOD OF MANUFACTURING SAME

This invention relates to a sealing material used for the prevention of water-leakage, for example, in joints of: building or construction materials, window sashes, doors, ceilings of bath rooms, roofing, construction panels, U-shaped concrete water supply or drain ditches, Hume water supply or drain concrete pipes and cast steel water supply and drain pipes, and in the seam portions of waterproofed fabrics such as hoods or tents. The invention further relates to a method of manufacturing such a sealing material.

Some polymers capable of being swollen with water, such as formalized polyvinyl alcohol, metal salts of polyacrylic acid and methoxymethylated polyamide have been heretofore proposed as sealing materials. However, these polymers have some disadvantages. First, it is difficult or impossible to shape these polymers into a suitable form by a melt shaping procedure and, therefore, these polymers are generally coated or impregnated on a woven or knitted fabric or a nonwoven fabric, and the fabric coated or impregnated with such polymers is shaped into a sealing material of a suitable form. Secondly, this sealing material is not satisfactory in sealing capacity.

For example, most polyvinyl alcohols absorb a large amount of water and exhibit an increased capacity of being swollen with water and, therefore, are suitable per se for sealing materials. However, the larger the polymer's capacity of being swollen with water is, the more difficult it becomes to shape the polymer into a sealing material of a suitable form by a melt shaping procedure. Even if polyvinyl alcohol is chemically modified, for example, by copolymerization and formalization, in order to impart melt shapability thereto, such chemically modified polyvinyl alcohol is still unsatisfactory because its elasticity and capacity of being swollen with water is poorer than the unmodified polyvinyl alcohol.

It is an object of the present invention to provide a sealing material for prevention of water-leakage, which possesses an enhanced capacity of being swollen with water, but a satisfactory resistance to water and good dimensional stability, i.e., does not dissolve in water even when immersed in water over a long period of time.

Another object is to provide a sealing material for prevention of water-leakage in the various forms which can be advantageously produced by a melt-shaping procedure.

Still another object is to provide a sealing material possessing an enhanced capacity of preventing water-leakage and having good durability.

Other objects and advantages will be apparent from the following description.

In accordance with the present invention, there is provided a sealing material for prevention of water-leakage which possesses a degree of swelling with water of 50 to 300% by weight and consists essentially of:

a. at least one polymer selected from the group consisting of a water-insoluble partially saponified polyvinyl alcohol, a water-insoluble ethylenically unsaturated compound-copolymerized polyvinyl alcohol and a water-insoluble polyvinyl alcohol at least partially cross-linked with novolak resin, and;

b. a plasticizer in an amount of 5 to 100 parts by weight based on 100 parts by weight of said polymer.

The sealing material of the invention should possess a degree of swelling with water of 50 to 300% by weight, preferably 60 to 200% by weight. When the degree of swelling with water is less than approximately 50% by weight, the sealing material is poor in its capacity to be swollen with water and in elasticity and, therefore, has a reduced sealing effect and is not easy to apply or fix to the joints or seams. In contrast, when the degree of swelling with water exceeds approximately 300% by weight, the sealing material tends to become sticky and flow when it absorbs water, and the sealing effect does not last.

By the term "degree of swelling with water" used herein is meant the ratio of the weight of water absorbed by the material to the original conditioned weight of the material, which is calculated from the following formula Degree of swelling with water in percent = $[(B - A)/A] \times 100$ where:

A = weight of conditioned specimen material, and
B = weight of specimen material after immersion in water at 40° C for 24 hours.

The sealing material of the invention should preferably possess a rate of swelling with water, as determined by a procedure hereinafter set forth, of 1.0 to 30%/min. When the rate of swelling with water is less than 1.0%/min, the sealing material tends to readily absorb moisture in the air and become soft and, therefore, is not easy to apply or fix to the joints and the seams and difficult to store. In contrast, with the rate of swelling with water exceeding 30%/min, too long a period of time is required for the sealing material to exercise the intended sealing effect for prevention of water-leakage when in contact with water.

Further, the sealing material of the invention should preferably possess a hardness, as determined by a procedure hereinafter set forth, of 5° to 80°, more preferably 10° to 75°. A hardness of less than 5° means that the sealing material is too soft to apply to or fix to the joints or the seams. In contrast, with hardness exceeding 80°, the sealing material is too hard to handle, and the feel of the fabric is injured when the sealing material is applied to the seam area of the fabric.

The term "saponified" as used herein is synonymous with "hydrolyzed" and designates the replacement of ester radicals by hydroxyl radicals. The partially saponified polyvinyl alcohol used herein means a polymer which is prepared by partially saponifying polyvinyl acetate and, therefore, has both units of vinyl acetate and vinyl alcohol. This may be accomplished by alcoholysis with ethanol or methanol with either acid or preferably base as catalyst. "Saponification degree" is the mole percentage of ester radicals which have been converted to hydroxyl radicals. The degree of saponification is such that the partially saponified polyvinyl alcohol is insoluble in water and provides a sealing material possessing a degree of swelling with water of 50 to 300% by weight.

The partially saponified polyvinyl alcohol has a saponification degree of preferably 35 to 65% by mole, more preferably 38 to 60% by mole and a number average polymerization degree of preferably 500 to 3,500, more preferably 800 to 3,000. The polyvinyl alcohol with a saponification degree of less than 35% by mole does not provide a sealing material possessing the desired degree of swelling with water and rate of swelling with water. In contrast the polyvinyl alcohol with a saponification degree exceeding 65% by mole partially dissolves in water when in contact with water and is poor in compatibility with the plasticizer to be mixed therewith and, therefore, becomes inferior in sealing capacity and other properties. The partially saponified polyvinyl alcohol with a number average polymerization degree exceeding 3,500 is poor in fluidity in the molten state and, therefore, cannot easily be shaped into a sealing material of the desired form, and restricts the type of plasticizer capable of being incorporated thereinto. In contrast, the partially saponified polyvinyl alcohol with a number average polymerization degree of less than 500 results in a sealing material of reduced mechanical strength. In addition, it is difficult to melt-shape such a low molecular weight polymer into, for example, a film form.

The ethylenically unsaturated compound-copolymerized polyvinyl alcohol used in the present invention means a copolymer prepared by partially or almost completely saponifying an ethylenically unsaturated compound-vinyl acetate copolymer. The saponification degree of the copolymer is not particularly critical, but should preferably be at least 50% by mole, and more preferably at least 85% by mole. The ethylenically unsaturated compound includes, for example, olefins having 2 to 4 carbon atoms such as ethylene, propylene, n-butylene and isobutylene, and; other copolymerizable monomers such as acrylonitrile and acrylamide.

The particular ethylenically unsaturated compound, the amount thereof present in the copolymer, the degree of saponification and the degree of polymerization may suitably be determined in consideration of degree of swelling with water, rate of swelling with water and hardness of the resulting sealing material. In general, the amount of the ethylenically unsaturated compound present in the copolymer may be varied preferably within the range from 1 to 30% by mole.

The polyvinyl alcohol at least partially crosslinked with novolak resin, which is used in the present invention means a polymer prepared by treating partially or almost completely saponified polyvinyl alcohol with novolak resin, i.e., a fusible resin prepared by condensational reaction of phenolic compounds, such as phenol, p-tert-butylphenol and p-phenylphenol with formaldehyde in the presence of acid catalyst. The polyvinyl alcohol at least partially crosslinked with novolak resin is generally formed by blending a water-soluble polyvinyl alcohol with novolak resin and then melt-shaping the blend into a sealing material of the desired form. In the course of melt-shaping, the blend is subjected to heating and a crosslinked structure is formed. The saponification degree of polyvinyl alcohol used for the preparation of the crosslinked polyvinyl alcohol is not particularly critical, but should preferably be at least approximately 85% by mole.

The amount of novolak resin to be blended with polyvinyl alcohol is preferably 3 to 100 parts by weight based on 100 parts by weight of polyvinyl alcohol. When the amount of novolak resin is too small, the resulting sealing material is poor in resistance to water, particularly hydrostatic pressure determined by a procedure hereinafter set forth. In contrast, when the amount of novolak resin is too large, the resulting sealing material is hard and brittle, and not easy to apply or fix to the joints or the seams.

The above-mentioned partially saponified polyvinyl alcohol, ethylenically unsaturated compound-copolymerized polyvinyl alcohol and polyvinyl alcohol at least partially crosslinked with novolak resin may be used either alone or in combination. These polymers are incapable of being subjected to melt shaping, but the blend thereof with a plasticizer is capable of being subjected to melt shaping. The amount of plasticizer incorporated into these polymers is 5 to 100 parts by weight, preferably 10 to 30 parts by weight, based on 100 parts by weight of the polymer. When the amount of plasticizer is less than the lower limit, the resulting composition is poor in melt shapability and the sealing material is too hard and is poor in elasticity. In contrast, when the amount of plasticizer exceeds the upper limit, the resulting sealing material tends to become sticky or flowable and, therefore, is not satisfactory, and, in addition, some plasticizers tend to migrate from the sealing material.

Illustrative of such plasticizers are glycerin, polyglycerin, phthalic acid glyceryl ester, propionic acid glyceryl ester; trimethylolpropane monoacetate, trimethyl-3-butene-1,2,3-tricarboxylate, trimethylbutane-1,2,3-tricarboxylate, dimethyl succinate, dimethoxyethyl succinate, monomethyl succinate, ethylethoxyethyl succinate, diisopropyl succinate, dimethoxyethyl adipate, ethylene glycol, propylene glycol, a low molecular weight polyethylene glycol, a low molecular weight polyethylene glycol glyceryl ether, ureaacetamide, pyrrolidone and trimethylolethane. These plasticizers may be used alone or in combination.

A combination of a water-soluble plasticizer such as glycerin and a slightly water soluble plasticizer such as phthalic acid glyceryl ester is preferable. This combination results in the sealing material possessing well balanced properties, because the water-soluble plasticizer enhances the sealing material's capacity of being swollen with water and thus the sealing effect, and the slightly water soluble plasticizer enhances the water resistance and thus the durability. The proportion of the watersoluble plasticizer to the slightly water soluble plasticizer may be varied within the range from 70 : 30 to 30 : 70 by weight.

For optimum results, suitable plasticizers depend upon the particular vinyl alcohol polymer. For example, a combination of glycerin and glyceryl ester of a carboxylic acid, such as phthalic acid glyceryl ester or propionic acid glyceryl ester, is most preferable for a partially saponified polyvinyl alcohol. Glycerin or glyceryl ester of a carboxylic acid such as phthalic acid and propionic acid is most preferable for an ethylenically unsaturated compound-copolymerized polyvinyl alcohol, particularly an olefin copolymerized polyvinyl alcohol. A combination of glycerin and phthalic acid glyceryl ester, i.e., a low molecular weight condensation product of glycerin and phthalic acid is most preferable for a polyvinyl alcohol at least partially crosslinked with novolak resin. These result in a sealing material particularly superior in melt shapability and capacity of being swollen with water.

If desired, suitable additives may be incorporated into the sealing material composition of the present invention, such as pigments, lubricants, stabilizers, foaming agents, fillers and surface active agents.

The sealing material composition can be shaped into any desired form by a melt shaping procedure such as melt extrusion. The preferable method whereby the sealing material is manufactured varies depending upon the polymer. In the case of a partially saponified polyvinyl alcohol or an ethylenically unsaturated compound-copolymerized polyvinyl alcohol, the polymer is mingled with the plasticizer at a temperature of not higher than 40° C, and then, the mixture is heated to a temperature of 70° to 100° C, and maintained at a temperature of 70° to 100° C until the polymer is intimately mixed with the plasticizer. In the case of a water-insoluble polyvinyl alcohol at least partially cross-linked with novolak resin, a water-soluble polyvinyl alcohol is mingled with the plasticizer at a temperature of not higher than 40° C, and the mixture is heated to a temperature of 70° to 100° C, and maintained at a temperature of 70° to 100° C until the polymer is intimately mixed with the plasticizer, and then, the intimate mixture is mingled with the novolak resin.

The manner whereby each polymer is mingled with the plasticizer is not critical. Known mixing means may be employed such as a Henschel mixer and super mixer. It is preferable that the polymer and the plasticizer are dried before mingling or during mingling. It is preferable in order to further enhance the melt shapability that the mixture be maintained at a temperature of 70° to 100° C until the polymer is intimately mixed with the plasticizer, during the mingling or, more preferably, after the mingling as mentioned above. The period of time, for which the mixture is maintained at that temperature, is usually more than 30 minutes.

As a melt shaping procedure, known procedures can be employed such as, for example, a melt-extrusion procedure, a melt-extrusion and inflation procedure, a calendering procedure and a casting procedure. Of these, a melt-extrusion procedure is preferable. The melt shaping temperature is preferably 160° to 230° C.

The sealing material of the present invention may be of any desired form such as, for example, sheet, film, powder or particle, rod and gut. The suitable form depends upon the use. For example, as a sealing material for preventing water leakage in the seam area of a waterproofed fabric, a film of a suitable thickness, preferably 0.05 to 5 mm thickness is preferable.

Fibers, yarns, woven or knitted fabrics, non-woven fabrics, papers and films may be embedded in or laminated with the sealing material of the present invention in order to reinforce the sealing material. For example, a composite tape prepared by laminating a film of the sealing material with woven or knitted fabric or non-woven fabric is particularly suitable for preventing water-leakage in the seam area of a waterproofed fabric, because the composite tape can be easily sewn together with waterproofed fabrics. An adhesive may be incorporated in the sealing material or applied to the surface of the sealing material.

The sealing material of the present invention is utilized for the prevention of water-leakage in joints of: for example, various building and construction materials, window sashes, doors, ceilings of bath rooms, roofing, construction panels, U-shaped concrete water supply or drain ditches, Hume concrete water supply or drain pipes and cast steel water supply or drain pipes, concrete blocks and paving bricks, and; in the seam area of waterproofed fabrics such as ducks.

The sealing material is readily swollen with water when exposed to rain and stops leaks in the joints or the seams. For example, in the case where the sealing material in the form of tape is sewn together with the margins of two waterproofed fabrics in a state such that the sealing tape is sandwiched between the two superposed margins, the sealing tape stops leaks through the needle holes and the gap between the superposed margins. If a roll of such sealing tape is provided in a sewing machine, the sewing operation can easily be carried out. This application procedure is advantageously employed in the sewing of various, known waterproofed fabrics such as waterproofed ducks, rubber-coated fabrics and tarpaulins.

The above application procedure is advantageous in that the following defects of known application procedures can be obviated.

One known application procedure wherein a liquid seam-sealing resin composition is applied to the surface of the seam area of waterproofed fabrics has the defects that, first, it is troublesome to coat the seam area with the sealing liquid; second, the coated seam area is stained and of a seedy appearance, and, third; the coated resin tends to deteriorate with the lapse of time and become poor in its capability to prevent water-leakage.

Another known procedure wherein the margins of fabrics coated with a thermoplastic resin-containing water-proofing agent are joined together by using a high frequency welding machine has the defects that, first, it is difficult to obtain a uniform, strong adhesion over the entire seam length; second, a large amount of waterproofing agent is required, and; third, a high frequency welding procedure cannot be employed for fabrics of complicated shape.

Besides the above, the sealing material of the present invention has the following advantages.

Firstly, the sealing material is melt shapable and can be shaped into any desired form. In other words, sealing material suitable to any type of joints can be manufactured, and the sealing material can easily be placed in the required positions. Secondly, the sealing material possesses good elasticity, and compressibility and, therefore, can be inserted in the compressed state in the joints. This ensures continued sealing even when the joints vibrate or slip out of place to a minor extent. Thirdly, the sealing material is soft and elastic when it absorbs water and, therefore, has improved sealing effect even when it is fitted in joints with complicated shapes. Fourthly, the sealing material is predominantly comprised of a modified polyvinyl alcohol, which is excellent in weather resistance, and therefore, the sealing material exhibits little or no deterioration over a long period of time.

Characteristics, other than the degree of swelling with water hereinbefore set forth, of the sealing materials used herein were determined as follows.

"Rate of swelling with water", which means the rate of the increase in weight of the sealing material due to water absorption, was calculated from the formula:

Rate of swelling with water in %/min = $(C-D)/(5 \times D) \times 100$ where:

D = weight of the specimen before immersion in water and

C = weight of the specimen after immersion in water at 40° C for 5 minutes.

"Hardness" was determined on the specimen having a thickness of at least 12 mm according to JIS (Japanese Industrial Standard) -K 6301 by using a spring type hardness tester.

"Water resistance", which means the increase in weight of the sealing material due to water immersion, was calculated from the formula:

Water resistance in percent = (F−E)/E × 100 where:
E = weight of a specimen having 4 cm × 5 cm size before immersion in water and
F = weight of the specimen after immersion in water at 40° C for 24 hours.

"Hydrostatic pressure" means the resistance of sewn fabrics to the penetration of water through the seam portions under static pressure, and was determined on the prepared specimen as follows. Two waterproofed fabrics were sewn together in a manner such that a sealing material in the form of a 30 mm wide tape was sandwiched between the superposed margins of the fabrics and the superposed margins were sewn together by two seam lines of a sewing thread, each of which seam lines had 18 to 20 stitches per 10 cm lengths. The sewn fabric was immersed in water for 1 hour, and then, manual crumpling up-and-stretching was repeated twenty times. Then, the sewn fabric was tested for its hydrostatic pressure by using a Schopper's hydrostatic pressure tester.

"Tensile strength" was determined on a specimen of the dumbbell No. 3 type according to JIS-K 6301 by using a tensile tester and expressed in kg/cm².

The invention is further illustrated by reference to the following examples in which parts and percentages are be weight unless otherwise specified.

EXAMPLE 1

20 parts of glycerin (plasticizer) and 1 part of calcium stearate (lubricant) were added to 100 parts of particles of polyvinyl alcohol having a saponification degree of 45% by mole and a number average polymerization degree of 1,700. After the mixture was fully mixed at 30° C, the mixture was heated to 90° C and maintained at that temperature over a period of 4 hours. The resulting uniform, intimate mixture was found to be such that glycerin permeated all the polyvinyl alcohol particles but did not migrate out of the particles. The intimate mixture was melt-shaped at 200° C, by using an extruder with a T-die into a sheet of 1.0 mm thickness and 30 mm width.

The sheet exhibited satisfactory swelling properties. That is, it had a degree of swelling with water of 158%, a rate of swelling with water of 10.4%/min and a hardness of 33°. When the sheet was immersed overnight in water having a temperature of 25° C, it was swollen to a great degree, but did not dissolve.

EXAMPLE 2

The procedure of Example 1 was repeated wherein various plasticizers shown in Table I, below, were separately used instead of glycerin with all other conditions remaining substantially the same. Properties of the resultant sheets are shown in Table I.

Table I

| Run No. | Plasticizer | Degree of swelling in water (%) | Rate of swelling in water (%/min) | Hardness (degrees) | Water resistance (%) |
| --- | --- | --- | --- | --- | --- |
| 2-1 | Glycerin (= Example 1) | 158 | 10.4 | 33 | 22.6 |
| 2-2 | Propionic acid glyceryl ester | 103 | 4.1 | 41 | 7.5 |
| 2-3 | Phthalic acid glyceryl ester | 110 | 4.5 | 42 | 8.3 |
| 2-4 | Glycerin (50%) + Propionic acid glyceryl ester (50%) | 137 | 7.8 | 35 | 12.6 |
| 2-5 | Glycerin (50%) + phthalic acid glyceryl ester (50%) | 141 | 8.3 | 37 | 13.3 |

EXAMPLE 3

The procedure of Run Nos. 2–4 in Example 2 was repeated wherein the amount of the plasticizer, i.e. a mixture of glycerin (50%) and propionic acid glyceryl ester (50%), was varied as shown in Table II, below, with all other conditions remaining substantially the same. Properties of the resultant sheets are shown in Table II.

Table II

| Run No. | Amount of plasticizer added in parts per 100 parts of PVA *1 | Degree of swelling in water (%) | Rate of swelling in water (%/min) | Hardness (degrees) | Water resistance (%) | Melt shapability |
| --- | --- | --- | --- | --- | --- | --- |
| 3-1 | 3 | 56 | 0.8 | 95 | 2 | Poor |
| 3-2 | 5 | 95 | 2.3 | 78 | 4 | Good |
| 3-3 | 30 | 157 | 8.5 | 28 | 15 | Good |
| 3-4 | 100 | 230 | 13.5 | 15 | 31 | Good |
| 3-5 | 120 | 325 | 32.7 | 4 | 55 | Poor |

*1 Abbreviation for polyvinyl alcohol

EXAMPLE 4

100 parts of particles of polyvinyl alcohol having a saponification degree of 45% by mole and a number average polymerization degree of 1,700, 15 parts of glycerin, 15 parts of diisopropyl succinate and 1 part of calcium stearate were fully mixed with each other at 30° C. The mixture was heated to 80° C and maintained at that temperature over a period of 3 hours, thereby permeating the polyvinyl alcohol particles with glycerin. Then, the intimate mixture was melt-shaped at 190° C, by using an extruder with a T-die at a screw revolution of 60 r.p.m., into a film of 0.25 mm thickness and 30 mm width. The film had a degree of swelling with water of 157%, a rate of swelling with water of 8.5%/min, and a hardness of 28°.

Two commercially available polyester fiber ducks each waterproof finished with polyvinyl chloride were sewn together in a manner such that the polyvinyl alcohol film set forth above was sandwiched between the ducks' margins each having a 30 mm width and the ducks' margins were sewn together with two seam lines of a vinylon (acetalized polyvinyl alcohol fiber) No. 3 sewing thread, each of which seam lines had 18 to 20 stitches per 10 cm lengths. The sewn duck exhibited no water-leakage when exposed to rain, and had a hydrostatic pressure of higher than 1,000 mmH$_2$O.

EXAMPLE 5

100 parts of particles of polyvinyl alcohol having a saponification degree of 54% be mole and a number average polymerization degree of 2,500, 20 parts of glycerin, 10 parts of trimethylbutane-1,2,3-tricaboxylate and 1 part of calcium stearate were fully mixed with each other at 35° C. The mixture was heated to 90° C and maintained at that temperature over a period of 4 hours, thereby permeating the polyvinyl alcohol particles with glycerin. Then, the intimate mixture was melt-shaped at 190° C, by using an extruder with a T-die at a screw revolution of 50 r.p.m., into a film of 0.25 mm thickness and 30 mm width. Immediately after the melt extrusion, the film still in the molten state was laminated with a vinylon (acetalized polyvinyl alcohol fiber) Victoria lawn whereby the film was reinforced therewith. The reinforced film exhibited a degree of swelling with water of 125%, a rate of swelling with water of 5.3%/min, and a hardness of 42°.

Using the reinforced film as a sealing material, two commercially available vinylon ducks were sewn together in a manner similar to that in Example 4. The sewn duck exhibited no water-leakage when exposed to rain, and a hydrostatic pressure of higher than 1,000 mmH$_2$O.

EXAMPLE 6

100 parts of polyvinyl alcohol having saponification degree of 47% by mole and a number average polymerization degreeof 2,400, 25 parts of a product prepared by reacting one mole of glycerin with two moles of propionic acid, and 1.5 parts of calcium stearate were mixed with each other at 40° C for 45 minutes by a super-mixer and, then, maintained at 70° C over a period of 3 hours. The intimate mixture was melt-shaped at 190° C, by using an extruder having an inner diameter of 20 mm and provided with a T-die, thereby forming a film of 0.25 mm thickness. The resultant soft, transparent and strong film had a degree of swelling with water of 138%, a rate of swelling with water of 7.4%/min, and a hardness of 42°. Even after the film was left over a long period of time, there was observed little or no undesirable volatization or exhalation of the plasticizer incorporated therein. When the film was immersed in water at 25° C for 24 hours, it exhibited superior dimensional stability, i.e. it was swollen with water but did not dissolve in water.

EXAMPLE 7

A copolymer consisting of 3% by mole of propylene and 97% by mole of vinyl acetate was saponified with an aqueous sodium hydroxide solution thereby preparing a propylene-vinyl alcohol copolymer with a saponification degree of 99.3% by mole. To 100 parts of the propylene-vinyl alcohol copolymer, 25 parts of glycerin (plasticizer) and 1 part of calcium stearate (lubricant) were added and mixed. The intimate mixture was melt-shaped at 230° C, by using an extruder with a T-die, into a sheet of 1.0 mm thickness and 30 mm width. The sheet had a degree of swelling with water of 159%, a rate of swelling with water of 16.6%/min and a hardness of 60°.

A piece of the sheet was sandwiched in the bottom joint portion of a trough-shaped, galvanized iron sheet structure. When the galvanized iron sheet structure was filled with water and left over a period of 30 days, there was observed no water-leakage.

EXAMPLE 8

The procedure of Example 7 for the preparation of the sheet was repeated wherein various plasticizers shown in Table III, below, were separately used instead of glycerin with all other conditions remaining substantially the same. Properties of the resultant sheets are shown in Table III.

Table III

| Run No. | Plasticizer | Degree of swelling in water (%) | Rate of swelling in water (%/min) | Hardness (degree) | Water resistance (%) |
|---|---|---|---|---|---|
| 8-1 | Glycerin (= Example 7) | 159 | 16.6 | 60 | 23 |
| 8-2 | Propionic acid glyceryl ester | 138 | 13.2 | 63 | 8.2 |
| 8-3 | Phthalic acid glyceryl ester | 142 | 14.1 | 61 | 9.1 |

EXAMPLE 9

A copolymer consisting of 7% by mole of propylene and 93% by mole of vinyl acetate was saponified in a manner similar to Example 7, thereby, preparing a propylene-vinyl acetate-vinyl alcohol copolymer with a saponification degree of 53%. To 100 parts of the copolymer, 15 parts of glycerin and 1 part of calcium stearate were added and mixed. The intimate mixture was melt-shaped at 210° C, by using an extruder with a T-die at a screw revolution of 60 r.p.m., into a film of 0.25 mm thickness and 30 mm width. The film had a degree of swelling with water of 157%, a rate of swelling with water of 13.2%/min, a hardness of 65°, and a tensile strength of 135 kg/cm$^2$.

Using the film as a sealing material, two commercially available polyester fiber ducks were sewn together in a manner similar to that in Example 4. The sewn duck exhibited no water-leakage when exposed to rain, and a hydrostatic pressure of higher than 1,000 mmH₂O.

Comparative Example 1

Two commerically available polyester fiber ducks each waterproof finished with polyvinyl chloride were sewn together in a manner similar to that in Example 4, except that the polyvinyl alcohol sealing film was not used. After sewing, a commercially available seam-sealing liquid having the following composition was applied to the seam area.

| | |
|---|---|
| Polyvinyl chloride | 10 parts |
| Tetrahydrofuran | 45 parts |
| Methyl ethyl ketone | 45 parts |

The duck exhibited no water-leakage when exposed to rain, but the seam was stained. The hydrostatic pressure proved to be 300 to 400 mmH₂O.

EXAMPLE 10

100 parts of finely divided particles of polyvinyl alcohol having a saponification degree of 89% by mole and a number average polymerization degree of 1,800 and 30 parts of glycerin were fully mixed with each other while being heated. Then, 55 parts of finely divided novolak resin ("National Resin J-4002" trade name for a phenol-formaldehyde condensation product supplied by Matsushita Denko K. K.) was incorporated into the above mixture after the novolak resin was treated for removing unreacted formaldehyde therefrom. Immediately after the incorporation of the novolak resin, the mixture was melt-extruded at 190° C by an extruder into a circular cross-sectional rod having 0.5 mm diameter. The rod had a degree of swelling with water of 103%, a rate of swelling with water of 1.7%/min and a hardness of 70°. When the rod was immersed in water at 30° C for 2 hours, the rod did not dissolve but expanded only by 25% by volume based on the original volume.

For the purpose of comparison, a rod was prepared in a manner similar to the above except that the novolak resin was not incorporated. When this rod was immersed in water, it dissolved completely therein.

EXAMPLE 11

The procedure of Example 10 was repeated wherein various plasticizers shown in Table IV, below, were separately used instead of glycerin with all other conditions remaining substantially the same. Properties of the resultant rods are shown in Table IV.

Table IV

| Run No. | Plasticizer | Degree of swelling in water (%) | Rate of swelling in water (%/min) | Hardness (degrees) | Water resistance (%) |
|---|---|---|---|---|---|
| 11-1 | Glycerin (= Example 10) | 103 | 1.7 | 70 | 5.4 |
| 11-2 | Propionic acid glyceryl ester | 84 | 1.5 | 74 | 3.2 |
| 11-3 | Phthalic acid glyceryl ester | 89 | 1.6 | 72 | 4.3 |

What we claim is:

1. Sealing material for prevention of waterleakage which possesses a degree of swelling with water of 50 to 300% by weight, a rate of swelling with water of 1.0 to 30% per minute and a hardness of 5 to 80 degrees, and consists essentially of (a) a water-insoluble partially saponified polyvinyl alcohol having a saponification degree of 35 to 65% by mole and a number average polymerization degree of 500 to 3,500, and (b) a mixture of glycerin and the glyceryl ester of a carboxylic acid selected from the group consisting of phthalic acid and propionic acid, the proportion of the glycerin to the glyceryl ester of a carboxylic acid being within the range of from 70:30 to 30:70 by weight and said mixture being present in an amount of 5 to 100 parts by weight based on 100 parts by weight of said water-insoluble partially saponified polyvinyl alcohol.

2. A process of manufacturing a sealing material possessing a degree of swelling with water of 50 to 300% by weight, a rate of swelling with water of 1.0 to 30% per minute and a hardness of 5 to 80 degrees, which comprises the steps of: mixing (a) a water-insoluble partially saponified polyvinyl alcohol having a saponification degree of 35 to 65% by mole and a number average polymerization degree of 500 to 3,500, with (b) a mixture of glycerin and the glyceryl ester of carboxylic acid selected from the group consisting of phthalic acid and propionic acid, the proportion of the glycerin to the glyceryl ester of a carboxylic acid being within the range of from 70:30 to 30:70 by weight, in an amount of 5 to 100 parts by weight based on 100 parts by weight of said water-insoluble partially saponified polyvinyl alcohol, at a temperature of not higher than 40° C, heating the mixture to a temperature of 70° to 100° C maintaining the mixture at a temperature of 70° to 100° C until the partially saponified polyvinyl alcohol is intimately mixed with the mixture of glycerin and the glyceryl ester of a carboxylic acid and then melt shaping the intimate mixture thus obtained.

3. Sealing material according to claim 1 which is prepared in the form of a sheet or film.

4. Sealing material according to claim 1 which is prepared in the form of a powder or particle.

5. Sealing material according to claim 1 which is prepared in the form of a rod or gut.

* * * * *